(12) United States Patent
Igarashi et al.

(10) Patent No.: US 7,358,004 B2
(45) Date of Patent: Apr. 15, 2008

(54) CARBON BLACK, ELECTROCATALYST CARRIER FORMED FROM CARBON BLACK, AND ELECTROCATALYST AND ELECTROCHEMICAL DEVICE USING CARRIER

(75) Inventors: Hiroshi Igarashi, Toda (JP); Masamichi Ueda, Kamagaya (JP); Mitsuo Suzuki, Yokohama (JP); Shushichi Yoshimura, Tokyo (JP); Shinichi Kanamaru, Yokkaichi (JP)

(73) Assignee: N. E. Chemcat Corporation, Tokyo (JP)

( * ) Notice: Subject to any disclaimer, the term of this patent is extended or adjusted under 35 U.S.C. 154(b) by 316 days.

(21) Appl. No.: 10/281,968

(22) Filed: Oct. 29, 2002

(65) Prior Publication Data

US 2003/0108481 A1    Jun. 12, 2003

(30) Foreign Application Priority Data

Oct. 30, 2001    (JP) .............................. 2001-332798

(51) Int. Cl.
*C09C 1/48*    (2006.01)

(52) U.S. Cl. .......................... 429/30; 429/40; 502/185; 423/449.1

(58) Field of Classification Search ............. 423/449.1; 502/185; 429/30, 40
See application file for complete search history.

(56) References Cited

U.S. PATENT DOCUMENTS

| | | | | |
|---|---|---|---|---|
| 4,101,639 A | * | 7/1978 | Surovikin et al. | 423/449.1 |
| 5,733,480 A | * | 3/1998 | Lee et al. | 252/511 |
| 6,228,254 B1 | * | 5/2001 | Jossens et al. | 208/212 |
| 6,500,217 B1 | * | 12/2002 | Starz et al. | 29/623.5 |

FOREIGN PATENT DOCUMENTS

| | | | | |
|---|---|---|---|---|
| JP | 0007632 | * | 4/1979 | 423/449.1 |
| JP | 361252270 A | * | 11/1986 | 423/449.1 |
| JP | 9-167622 | | 6/1997 | |
| JP | 2000-100448 | | 4/2000 | |

OTHER PUBLICATIONS

Drogin, Isaac 'Developments and Status of Carbon Black' (1945), United Carbon Co, p. 90. No month.*

Vissers, J. P. R. et. al, 'Carbon Black-Supported Molybdenum Sulfide Catalysts' in Carbon an International Journal vol. 24, No. 4, pp. 485-493. (1987). No month.*

Mantell Industrial Carbon 2nd ed. Van Norstrand Co. 1946 p. 64.*

E. Auer, et al., "Carbons as supports for industrial precious metal catalysts", Applied Catalysis A: General, vol. 173, No. 2, XP-004271525, Oct. 25, 1998, pp. 259-171.

Akzo Chemie NEDERLAND BV, et al., Use of the electroconductive carbon Ketjenblack EC (CO8 k Mar. 2004), Research Disclosure, vol. 136, No. 34, XP-007103357, Aug. 1975, 2 pages.

K. Takei, et al., "Effects of the macroscopic structure of carbon black on its behaviour as the anode in a lithium secondary cell", Journal of Power Sources, vol. 55, No. 2, XP-004044385, Jun. 1995, pp. 191-195.

* cited by examiner

*Primary Examiner*—Stuart Hendrickson
(74) *Attorney, Agent, or Firm*—Oblon, Spivak, McClelland, Maier & Neustadt, P.C.

(57) ABSTRACT

A carbon black is provided which is useful as an electrocatalyst carrier. The carbon black has a DBP oil absorption of 170 to 300 cm$^3$/100 g, a specific surface area as measured by a BET method of 250 to 400 m$^2$/g, a primary particle diameter value of 10 to 17 nm, and a total volume of open pores at the surface which have a pore radius of 10 to 30 nm of 0.40 to 2.0 cm$^3$/g. The electrocatalyst can be used in electrochemical devices such as solid polymer electrolyte fuel cells.

5 Claims, 8 Drawing Sheets

CARBON BLACK, ELECTROCATALYST CARRIER FORMED FROM CARBON BLACK, AND ELECTROCATALYST AND ELECTROCHEMICAL DEVICE USING CARRIER

BACKGROUND OF THE INVENTION

1. Field of the Invention

The present invention relates to a novel carbon black, an electrocatalyst carrier formed from this carbon black, an electrocatalyst using such a carrier, and an electrochemical device such as a solid polymer electrolyte fuel cell using such an electrocatalyst.

2. Description of the Background Art

Solid polymer electrolyte fuel cells enable high current densities to be drawn at low temperatures, and as a result, such fuel cells are currently being developed as portable power supplies, drive sources for electric vehicles, and as cogeneration power supplies.

A solid polymer electrolyte fuel cell comprises an ion exchange membrane formed from the solid polymer electrolyte positioned between a fuel electrode (anode) and an air electrode (cathode). Both the fuel electrode and the air electrode are formed from a mixture of a catalyst comprising a supported noble metal and a polymer electrolyte.

According to such a structure, in the case of hydrogen as the fuel, hydrogen gas passes through pores in the fuel electrode and reaches the catalyst, and then emits electrons under the effect of the catalyst, forming hydrogen ions. These hydrogen ions are transported through the electrolyte in the electrode and the solid polymer electrolyte membrane between the two electrodes to the air electrode. The emitted electrons pass through the catalyst carrier within the electrode and flow into an external circuit, and then travel through the external circuit to the air electrode. In contrast, in the case of oxygen as the oxidant, oxygen passes through pores in the air electrode and reaches the catalyst, and then reacts with the hydrogen ions and the electrodes transported from the fuel electrode to generate water.

In a solid polymer electrolyte fuel cell, in order to accelerate the electrode reactions and improve the characteristics of the cell, the catalytic activity of the catalyst within the electrode must first be as high as possible. As a result, catalysts in which a highly active noble metal, and in particular platinum or a platinum alloy, is supported on a carbon black carrier are widely used.

In addition, in order to ensure the most efficient use of these very expensive noble metal catalysts, the contact surface area between the catalyst and the polymer electrolyte within the electrode must be increased. Furthermore, in order to reduce concentration overvoltage arising from the delay in gas supply to noble metal catalyst positioned in regions distant from the gas flow, the diffusion of gases (hydrogen, oxygen) supplied to the electrode reactions must be maximized.

Accordingly, much research is being conducted on both methods of supporting noble metals, and catalyst carriers. For example, as a method of improving the contact between the electrode catalyst and the polymer electrolyte, Japanese Laid-open publication (kokai) No. Hei 9-167622 (JP9-167622A) discloses a method for controlling the adsorption of noble metal particles within pores to which the polymer electrolyte cannot be distributed, by supporting the noble metal using a carbon black carrier in which the volume of pores with a diameter of no more than 8 nm is not more than 500 $cm^3/g$. Furthermore, using a similar approach, Japanese Laid-open publication (kokai) No. 2000-100448 (JP2000-100448A) discloses that using carbon black in which those pores with a diameter of less than 6 nm account for no more than 20% of total pores as a carrier is effective in improving the catalyst utilization.

Japanese Unexamined Laid-open publication (kokai) No. Hei 6-203840 (JP6-203840A) discloses that increasing the percentage of voids within the catalyst layer from 65 to 90% by volume is effective in improving the diffusion of reactant gas at the electrodes. In addition, other methods for improving the characteristics of a solid polymer electrolyte fuel cell include using an electrode in which the volume of pores with diameters within a range from 0.04 to 1 µm is at least 0.06 $cm^3/g$, as disclosed in Japanese Laid-open publication (kokai) No. Hei 9-92293 (JP9-92293A), and similarly using an electrode in which the volume of pores with diameters of greater than 0.1 µm is at least 0.4 $cm^3/g$, as disclosed in Japanese Laid-open publication (kokai) No. Hei 9-283154 (JP9-283154A).

In addition, Japanese Laid-open publication (kokai) No. Hei 6-203852 (JP6-203852A) discloses a method for ensuring sufficient pores for reactant gas diffusion within the electrode by adding a pore forming material during production of the electrode. Furthermore, J. Appl. Electrochem., Vol. 28 (1998) pp. 277 reports that addition of a pore forming material improves gas diffusion at the air electrode and improves the characteristics of a solid polymer electrolyte fuel cell.

SUMMARY OF THE INVENTION

However, in the transport of a reactant gas through the pores of an electrode to the catalyst, controlling only the pores in the surface of the primary particles, as described in the documents listed above, is unsatisfactory. Carbon black typically comprises secondary particles formed from the fusion of primary particles, and in order for a reactant gas to reach a noble metal supported on a carbon black carrier, the gas must pass through pores formed within these secondary particles. Accordingly, it can be predicted that the diffusion of the reactant gas will vary considerably depending on the pore structure of these secondary particles.

An object of the present invention is to resolve the aforementioned problems, by providing a novel carbon black which can be favorably used as a catalyst carrier, and which offers a pore structure which is ideal for improving the diffusion of a reactant gas to a catalyst in an electrode used in an electrochemical device such as a solid polymer electrolyte fuel cell.

Another object of the present invention is to provide an electrode catalyst carrier formed from such a carbon black, an electrode catalyst using such a carrier, and an electrochemical device such as a solid polymer electrolyte fuel cell using such an electrode catalyst.

In an attempt to resolve the problems described above, the inventors of the present invention conducted intensive research on the aforementioned pore structure which, in those cases in which a noble metal is supported on a carbon black carrier, functions as the route by which a reactant gas reaches the noble metal, and as a result were able to complete the present invention.

In other words, a first aspect of the present invention provides a carbon black with a DBP oil absorption of 170 to 300 $cm^3/100$ g, a specific surface area as measured by a BET method of 250 to 400 $m^2/g$, a primary particle diameter value of 10 to 17 nm, and a total volume of pores with a pore radius of 10 to 30 nm of at least 0.40 $cm^3/g$.

A second aspect of the present invention provides an electrocatalyst carrier formed from the above carbon black.

Furthermore, a third aspect of the present invention provides an electrocatalyst comprising an aforementioned carrier and platinum supported on this carrier, wherein the quantity of platinum relative to the entire mass of the electrocatalyst is within a range from 5 to 70 mass %.

In addition, a fourth aspect of the present invention provides an electrochemical device equipped with an aforementioned electrocatalyst.

DETAILED DESCRIPTION OF THE PREFERRED EMBODIMENTS

Figure 1:
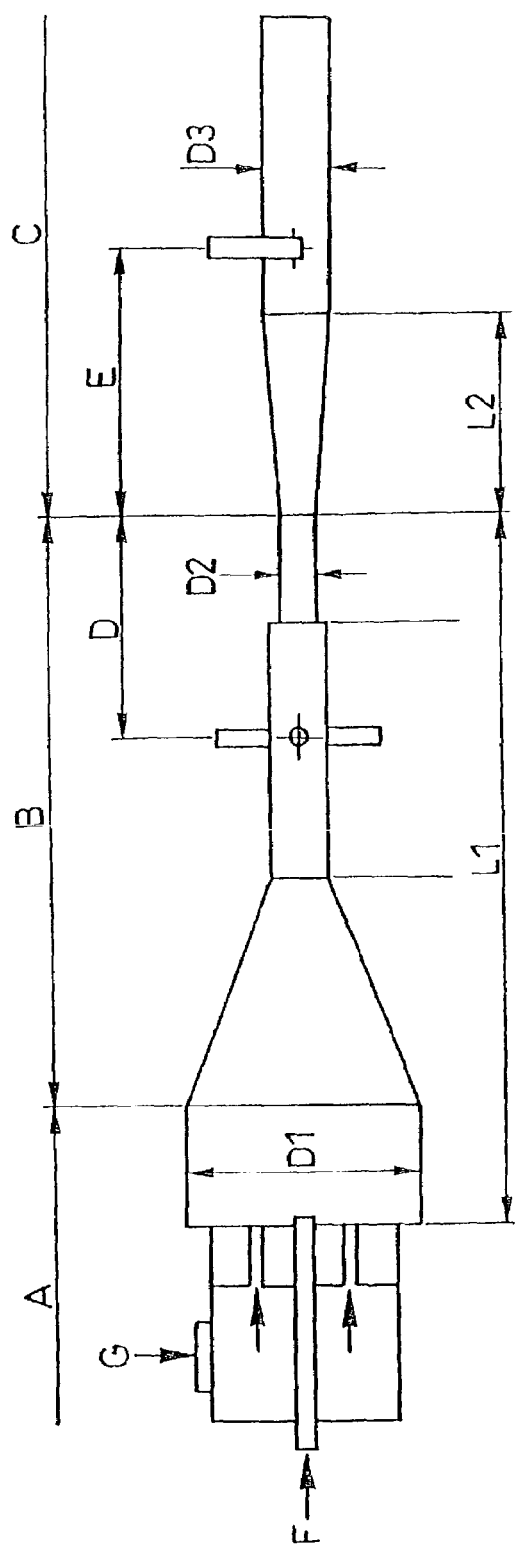
FIG. 1 is a schematic illustration showing a carbon black production apparatus.

As follows is a more detailed description of the present invention.

-Carbon Black and Carriers-

A carbon black of the present invention may be any carbon black which satisfies certain predetermined properties, and there are no particular restrictions on the type of carbon black, although furnace black is preferred. Furthermore, the total volume of the pores with a pore radius of 10 to 30 nm must be at least $0.40 \text{ cm}^3/\text{g}$, and preferably at least $0.50 \text{ cm}^3/\text{g}$.

In a carbon black of the present invention, the volume of the pores with a pore radius of 10 to 30 nm (hereafter referred to as the "specified pore volume") must be at least $0.40 \text{ cm}^3/\text{g}$. For example, in the case in which the carbon black is used as the carrier for an electrocatalyst of an air electrode in a solid polymer electrolyte fuel cell, the reaction can be considered to occur within those pores into which the oxygen reactant gas can readily diffuse, at the contact interface between the noble metal which promotes the reduction reaction of the oxygen, the polymer electrolyte which supplies the hydrogen ions from the fuel electrode necessary for the reaction, and the conductive carbon black carrier which transports the electrons generated as a result of the reaction. Of the available pores, those which are too small prove difficult for the polymer electrolyte to enter, and are also unsuitable as reactant gas supply routes as they display poor gas diffusion.

In the present invention, the carbon black carrier pores which the inventors of the present invention envisage as functioning as reactant gas supply routes are those pores which function as terminal routes for transporting the reactant gas from the larger diameter pores of the reactant gas supply routes provided by the electrode through to the noble metal supported by the carbon black carrier.

The larger the specified pore volume formed by the carbon black carrier becomes, the more effectively the reactant gas can be transported to the noble metal catalyst supported on the carbon black carrier, and consequently the specified pore volume must be at least $0.40 \text{ cm}^3/\text{g}$, and preferably at least $0.50 \text{ cm}^3/\text{g}$. If the specified pore volume is too small, then the absolute volume of the pores functioning as reactant gas supply routes is insufficient, and achieving the desired effect becomes difficult. For reasons associated with the production process, the specified pore volume is typically not more than $2.0 \text{ cm}^3/\text{g}$, and the production of carbon black with a specified pore volume greater than this value is problematic.

In a carbon black of the present invention, the DBP oil absorption is within a range from 170 to $300 \text{ cm}^3/100 \text{ g}$, and preferably from 180 to $250 \text{ cm}^3/100 \text{ g}$. In the case of a theoretical carbon black formed from primary particles with no pores, the DBP oil absorption is indicative of the quantity of secondary pores. However, as the quantity of primary particle pores increases, the measured DBP oil absorption value also incorporates these primary particle pores, and consequently the observed DBP oil absorption value increases. In a carbon black of the present invention, a DBP oil absorption value exceeding $300 \text{ cm}^3/100 \text{ g}$ indicates an excessive quantity of primary particle pores which are ineffective as reactant gas supply routes, and is consequently undesirable. On the other hand, if the DBP oil absorption value is less than $170 \text{ cm}^3/100 \text{ g}$, then the quantity of secondary pores to function as reactant gas supply routes is insufficient.

In addition, in a carbon black of the present invention, the primary particle diameter is within a range from 10 to 17 nm, and preferably from 13 to 16 nm. When an electrocatalyst is produced by supporting platinum, or in some cases another metal, on a carrier formed from a carbon black of the present invention, then in order to improve the catalytic activity per unit mass of the supported metal, it is preferable that the metal particles are supported in a highly dispersed state on the internal walls of the secondary pores of the carbon black, namely on the surface of the carbon black primary particles. Furthermore, in an electrode of a solid polymer electrolyte fuel cell, in order to enable the carbon black carrier to function as an electron conductor, the primary particles of the carbon black carrier should be in good mutual contact, to form a route for electron conduction. When carbon black is used as a carrier in the present invention, if the primary particle diameter exceeds 17 nm, then the activity of a produced electrocatalyst is likely to deteriorate. On the other hand, if the primary particle diameter is less than 10 nm, then the specific surface area becomes too large, and so from an industrial viewpoint, a large proportion of the raw material oil used undergoes gasification, resulting in a marked fall in productivity. In addition, handling of the product powder is also more difficult, making the product impractical.

A carbon black of the present invention has a specific surface area as measured by a BET method within a range from 250 to $400 \text{ m}^2/\text{g}$, and preferably from 250 to $350 \text{ m}^2/\text{g}$. Generally, if a carbon black with a large specific surface area is used as a carrier, then the noble metal particles can be supported in a more dispersed state. However, if a carbon black with a specific surface area exceeding $400 \text{ m}^2/\text{g}$ is used as a carrier, then the volume of micropores within the primary particles which are unable to function as reactant gas supply routes increases considerably, which is disadvantageous. In addition, as the specific surface area increases, a conductive carbon black becomes more susceptible to electrochemical corrosion. In contrast, if a carbon black for which the BET specific surface area is too small is used as a carrier, then the noble metal particles cannot be supported in a highly dispersed state, and the catalytic activity per unit mass of the supported metal tends to deteriorate.

There are no particular restrictions on the method of producing a carbon black of the present invention, and production can be performed, for example, using the method described below.

A typical example of a carbon black which displays the properties of the present invention is a furnace black, which is produced industrially using an oil furnace method. In an oil furnace method, a fuel such as gas or oil, and air is introduced into a special reaction section lined with bricks capable of withstanding high temperatures of approximately 2000° C. and is completely combusted, and once a high temperature atmosphere of at least 1400° C. has been formed, a liquid raw material is sprayed continuously into the reaction section and undergoes thermal decomposition. Water is then sprayed into the high temperature gas containing the generated carbon black in the downstream region of the furnace, thereby halting the reaction, and the product is then separated into carbon black and waste gas by a bag filter. Furnace black is generally produced by spraying a raw material oil such as creosote oil, EHE or tar into a complete combustion gas stream, although the quality of the furnace black and other properties such as the secondary particle pore structure and the particle diameter can be controlled by appropriate selection of a variety of conditions, including the type of raw material, the flow rate of the fuel, the air, and the raw material, the type and quantity of additives such as alkali metal salts in the reaction system, the combustion conditions, and the cooling rate.

As follows is a detailed description of a sample production apparatus, which is shown in FIG. 1.

This apparatus is an apparatus for producing carbon black by an oil furnace method, and comprises a first zone A for combusting a fuel and generating a high temperature gas, a second zone B connected downstream from the first zone A for introducing a raw material, and a third zone C connected even further downstream for rapidly cooling the generated carbon black using a water spray.

First, a heavy oil which functions as the fuel is introduced as a spray through a fuel inlet nozzle F, and this fuel is mixed with air for combustion purposes introduced through a combustion air inlet nozzle G, and is then combusted. The fuel used in this process is not limited to heavy oil, and may also use other liquid fuels such as light oil, gasoline or kerosene, and gaseous fuels such as natural gas, propane or hydrogen. The diameter (D1) of the combustion chamber in this apparatus is 1100 mm.

The apparatus is designed so that the generated combustion gas is transported through a gradually converging taper section, raising the gas flow rate through the furnace and raising the turbulent energy within the furnace.

In the second zone B, the carbon black raw material is introduced through six raw material inlet pipes provided at a position (the raw material inlet position) located a distance D upstream from the downstream edge (namely, the border between the second zone B and the third zone C) of a restriction section with the narrowest diameter in the apparatus (the diameter (D2) of this section is 175 mm). The raw material introduced at this point is generally a coal based hydrocarbon such as creosote oil, or a petroleum based hydrocarbon such as ethylene bottom oil. By adjusting the raw material inlet position and the quantity of the raw material oil used, the particle diameter (the primary particle diameter) and the degree of linking between particles (the secondary particle structure) can be altered. The distance (L1) between the front edge of the combustion chamber and the aforementioned downstream edge of the restriction section is 3300 mm.

In the third zone C, the restriction section described above is linked to a reaction halting pipe section via a taper section. The reaction generating the carbon black is halted through rapid cooling which is achieved by spraying water through a cooling water inlet pipe provided at a position (the reaction halting position) located a distance E downstream from the aforementioned downstream edge of the restriction section. In the present example, the length (L2) of the taper section mentioned above is 1800 mm, and the diameter (D3) of the reaction halting pipe section is 400 mm.

A collection device such as a bag filter or a cyclone is connected downstream from the third zone C, and this device is used to separate the gas and the carbon black.

The most significant characteristics of a carbon black of the present invention are the specified DBP oil absorption and specific surface area values, and the fact that the specified pore volume is at least 0.40 $cm^3/g$. It is envisaged that this type of special pore distribution comprises a wide distribution of primary particle diameters, namely a mixture of large diameter particles and small diameter particles, and that these particles are linked together in the manner of a bunch of grapes, forming a carbon black with many voids.

When producing this type of carbon black, the raw material inlet section of the aforementioned second zone B should preferably present an atmosphere with a wide temperature distribution and a wide distribution for the residence time. By ensuring such wide distributions, a carbon black comprising a mixture of primary particles of large diameter and primary particles of small diameter is generated, and moreover because the flow line distribution for the raw material stream within the furnace will also increase, a variety of primary particles and secondary particles will fuse together in a complex manner, generating a carbon black with large voids.

-Electrocatalysts-

The present invention also relates to an electrocatalyst comprising a carrier formed from a carbon black having the particular physical properties as described above, and platinum supported on this carrier, wherein the quantity of platinum relative to the mass of the entire electrocatalyst is within a range from 5 to 70 mass %.

Depending on the situation, other metals may also be supported on the aforementioned carrier in addition to platinum. Examples of these other metals include one or more metals selected from the group consisting of palladium, rhodium, iridium, ruthenium, gold, silver, iron, zinc, nickel, molybdenum, cobalt, tin, chromium, manganese, rhenium, tungsten and copper.

The platinum in the electrocatalyst may exist in a simple metallic state, or as an oxide, or as a hydroxide. The platinum may also exist as an alloy or as a compound oxide with one or more of the other metals described above. Furthermore, the platinum may exist as a mixture of these states. Preferred states for the platinum includes simple metallic state and an oxide state.

In the electrocatalyst, the ideal quantity of platinum relative to the mass of the entire electrocatalyst is within a range from 5 to 70 mass %, and preferably from 10 to 60 mass %. At platinum quantities of less than 5 mass %, the number of platinum particles (here, the term "platinum particles" includes platinum in the metallic state, as well as platinum alloys and platinum compounds, as described above) within the secondary pores formed in the furnace black carrier is insufficient, and the process of diffusion of the reactant gas to the platinum particles becomes more difficult. As a result, supply of the reactant gas to the platinum particles is likely to be unsatisfactory, leading to a deterioration in the electrode performance. In contrast, if the quantity of platinum exceeds 70 mass %, then the diameter of the platinum particles is likely to increase, leading to a reduction in the catalytic activity per unit mass of the platinum, and a subsequent deterioration in the electrode performance.

In those cases in which another metal is supported in addition to platinum, then in order to achieve a further increase in catalytic activity, the quantity of the other metal per 1 mol of supported platinum should preferably be within a range from 0.05 to 4 mols, and even more preferably from 0.25 to 2 mols.

Production of an electrocatalyst according to the present invention can be achieved, for example, by forming a slurry of the carbon black suspended in a predetermined quantity of water, adding a predetermined quantity of a platinum containing aqueous solution of hexachloroplatinic acid (IV), subsequently performing a reduction treatment using a 10 fold equivalence of hydrazine hydrate relative to the quantity of platinum, and then filtering, washing, drying and crushing the product thus obtained. This process yields an electrocatalyst in a powdered state. In those cases in which, in addition to platinum, one of the other metals described above such as ruthenium is also to be supported, then a carbon black-supported Pt catalyst powder prepared in the manner described above is suspended in a predetermined quantity of water to form a slurry, a predetermined quantity of a ruthenium containing aqueous solution of ruthenium (III) trioxide is then added, and following neutralization with a 3 fold equivalence of a sodium hydroxide solution relative to the quantity of ruthenium, the reaction mixture is filtered, dried, and reduced by hydrogen at 500° C. to yield an electrocatalyst powder.

As described above, the present invention focuses on the use of the secondary pores formed within a carbon black carrier as a supply route for transporting a reactant gas to an active metal supported on the carrier, and provides the ideal ranges for a variety of carrier properties. By supporting platinum using a carbon black of the present invention as the carrier, an electrocatalyst with superior performance can be obtained.

-Electrochemical Devices-

An electrocatalyst of the present invention is not only suitable for use within a solid polymer electrolyte fuel cell, but is also useful as an electrocatalyst for any electrochemical device which utilizes an electrode. Examples of other electrochemical devices include electrolysis devices and sensors.

EXAMPLES

As follows is a description of specifics of the present invention based on a series of preparation examples and working examples, although the present invention is in no way limited to Examples presented.

[Production of Carbon Blacks]

Example 1

(Production of a Furnace Black A)

Using the apparatus shown in FIG. 1, and following the production method described above, a carbon black was produced under the production conditions shown in Table 1. This product was termed "furnace black A".

Figure 2:
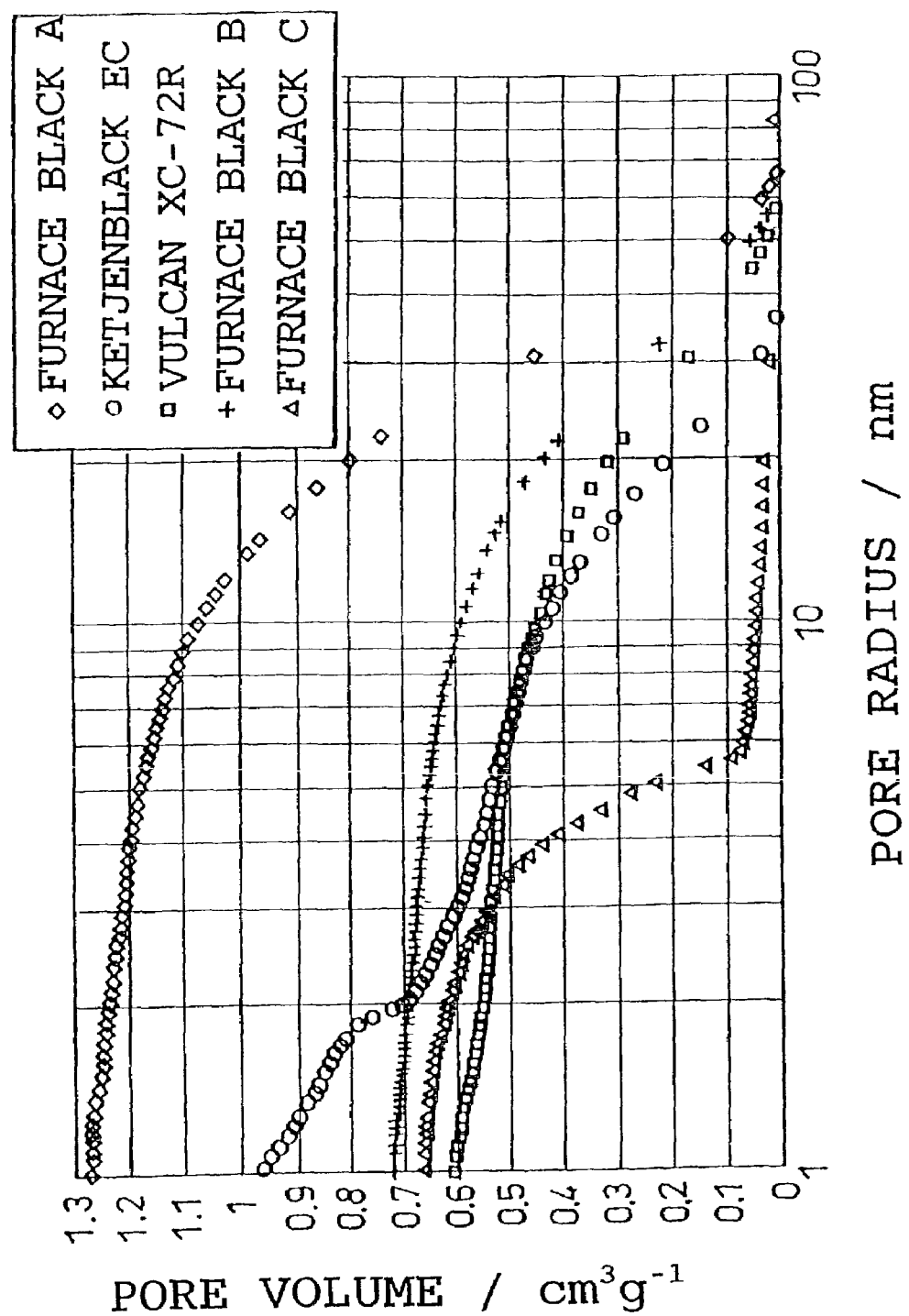
FIG. 2 is a graph showing the relationship between the pore radius and the total volume of pores with that particular radius or larger radiuses for carbon blacks used in Example 2 and in Comparative Examples 3 to 6.

This furnace black A has the specific surface area, DBP oil absorption and primary particle diameter values shown in Table 1, and is bulky product with large internal voids and a considerable degree of gas permeation. Furthermore, FIG. 2 shows that this furnace black A has a specified pore volume of not less than 0.40 cm$^3$/g.

Comparative Example 1

(Production of a Furnace Black B (For Comparison))

Using the apparatus shown in FIG. 1, but with the exception of providing two cooling water inlet pipes in the reaction halting pipe section of the third zone C, and following the production method described above, a carbon black was produced under the production conditions shown in Table 1. This product was termed "furnace black B".

This furnace black B has the specific surface area, DBP oil absorption and primary particle diameter values shown in Table 1, and in comparison with the furnace black A of Example 1, displays a smaller specific surface area and a smaller pore volume, and consequently the degree of gas permeation is lower.

Comparative Example 2

(Production of a Furnace Black C (For Comparison))

Using the apparatus shown in FIG. 1, but with the exception of adding potassium carbonate ($K_2CO_3$), which functions as a secondary structure control agent, to the liquid raw material, and following the production method described above, a carbon black was produced under the production conditions shown in Table 1. This product was termed "furnace black C".

The potassium carbonate ($K_2CO_3$) functions by inhibiting aggregation of the primary particles to form secondary particles.

This furnace black C has the specific surface area, DBP oil absorption and primary particle diameter values shown in Table 1, and in comparison with the furnace black A of Example 1, displays a smaller DBP oil absorption and a smaller pore volume, and consequently the degree of gas permeation is lower.

Comparative Examples 3 and 4

Table 1 also shows the physical properties of the commercially available carbon black products "Ketjenblack EC" (brand name, manufactured by KETJEN BLACK INTERNATIONAL COMPANY) (Comparative Example 3) and "Vulcan XC-72R" (brand name, manufactured by Cabot Corporation) (Comparative Example 4). Both of these products has a small pore volume, and in comparison with the furnace black A of Example 1, display a lower degree of gas permeation.

[Methods of Evaluating Carbon Blacks]

<Measurement of Pore Distribution>

Pore distribution was measured by a BJH method using a TriStar 3000 nitrogen adsorption analyzer manufactured by Micromeritics Instrument Corporation.

The results of pore distribution measurements by a BJH method on the furnace black A of the Example 1, the furnace black B and the furnace black C of the above Comparative Examples 1 and 2, and the two commercial products of Comparative Examples 3 and 4 mentioned above, are shown in FIG. 2.

<Measurement of DBP Oil Absorption>

A 20.00 g sample (A) which had been dried for 1 hour at a temperature of 150° C.±1° C., was placed in the mixing chamber of an absorptometer (manufactured by Brabender, spring tension 2.68 kg/cm), and the rotation device of the mixing chamber for which the limit switch has been preset to a predetermined position (the limit switch is set to a position which corresponds with approximately 70% of maximum torque) is then rotated. At the same time, addition of DBP (specific gravity 1.045 to 1.050) is commenced via an automatic burette at a rate of 4 ml/minute. Approaching the end point, the torque increases rapidly, activating the limit switch. The quantity of DBP added up until this switch point (B ml) is used to calculate the DBP oil absorption (D ml/100 g) value, using an equation: $D = B/A \times 100$.

<Measurement of Specific Surface Area>

Specific surface area was measured by a one point BET method using a Flowsorb 2300 manufactured by Micromeritics Instrument Corporation.

<Measurement of Primary Particle Diameter>

An image was captured of the small spherical components (which comprise contour lines due to microcrystals which cannot be separated) which make up a carbon black aggregate (secondary particle) using an electron microscope JSM-6300F manufactured by Jeol Co., Ltd., and the average diameter was then calculated based on this image.

performed in the same manner as Examples 2, and yielded an electrocatalyst powder containing 50% Pt. The powder produced a Pt analysis result of 47.8 mass %, and displayed a BET specific surface area of 146 $m^2/g$, a Pt surface area as determined by CO adsorption of 74 $m^2$/g-Pt, and a Pt crystallite diameter of 1.7 nm.

Example 4

21.7 g of the 30% Pt electrocatalyst prepared in Example 2 was weighed, and then suspended in water to form a slurry. An aqueous solution of ruthenium (III) trioxide containing 3.3 g of Ru was then added, and following neutralization

TABLE 1

|  |  | Example 1 Furnace black A | Comparative Example 1 Furnace black B | Comparative Example 2 Furnace black C | Comparative Example 3 Ketjen-black EC | Comparative Example 4 Vulcan XC-72R |
|---|---|---|---|---|---|---|
| Fuel air quantity | NM³/h | 5800 | 5800 | 5800 | | |
| Fuel air temperature | °C. | 640 | 640 | 640 | | |
| Type of fuel | — | C heavy oil | C heavy oil | C heavy oil | | |
| Fuel quantity | kg/h | 314 | 314 | 314 | | |
| Raw material oil quantity | kg/h | 850 | 850 | 850 | | |
| Raw material oil inlet position | mm | 2390 | 2390 | 400 | | |
| Number of raw material inlets | — | 6 | 6 | 6 | | |
| Concentration of secondary structure control agent | kg/t | — | — | 30 | | |
| Quantity of secondary structure control agent | L/h | — | — | 30 | | |
| Reaction halting position | mm | 1600 | 1600 | 1600 | | |
| Quantity of reaction halting water | kg/h | 1800 | 500 | 500 | | |
| Reaction halting position | mm | — | 1100 | — | | |
| Quantity of reaction halting water | kg/h | — | 1500 | — | | |
| Specific surface area | m²/g | 266 | 138 | 338 | 780 | 230 |
| DBP oil absorption | cm³/100 g | 200 | 226 | 83 | 350 | 190 |
| Primary particle diameter | nm | 15 | 20 | 13 | 30 | 30 |

[Preparation of Electrocatalyst Powders]

Example 2

35.0 g of the furnace black A of Example 1 was weighed, and then suspended in water to form a slurry. An aqueous solution of hexachloroplatinic acid (IV) containing 15.0 g of Pt was added, and a reduction treatment was then performed using a 10 fold equivalence of hydrazine hydrate relative to the quantity of platinum. The thus obtained product was then filtered, washed, dried and crushed, yielding an electrocatalyst powder containing 30% Pt. The powder produced a Pt analysis result of 30.8 mass %, and displayed a BET specific surface area of 185 $m^2/g$, a Pt surface area as determined by CO adsorption of 93 $m^2$/g-Pt (surface area per unit weight of Pt, subsequent values recorded in a similar manner), and a Pt crystallite diameter of 3.1 nm.

Example 3

With the exceptions of altering the quantity of the furnace black A used in Examples 2 to 25.0 g, and altering the quantity of Pt incorporated within the aqueous solution of hexachloroplatinic acid (IV) to 25.0 g, preparation was with a 3 fold equivalence of a sodium hydroxide solution relative to the quantity of ruthenium, the reaction mixture was filtered and dried, and then reduced by hydrogen at 500° C. The product powder revealed a Pt analysis result of 27.1 mass % and a Ru analysis result of 12.1 mass %, and displayed a BET specific surface area of 188 $m^2/g$, and a Pt crystallite diameter of 4.2 nm.

Comparative Example 5

With the exception of replacing the furnace black A used in Example 2 with the commercially available Ketjenblack EC of Comparative Example 3, preparation was performed in the same manner as Example 2, and yielded an electrocatalyst powder containing 30% Pt. The powder produced a Pt analysis result of 29.7 mass %, and displayed a BET specific surface area of 434 $m^2/g$, a Pt surface area as determined by CO adsorption of 128 $m^2$/g-Pt, and a Pt crystallite diameter of 1.5 nm.

Comparative Example 6

With the exception of replacing the furnace black A used in Example 2 with the commercially available Vulcan XC72R of Comparative Example 4, preparation was performed in the same manner as Example 2, and yielded an electrocatalyst powder containing 30% Pt. The powder produced a Pt analysis result of 30.2 mass %, and displayed a BET specific surface area of 153 $m^2/g$, a Pt surface area as determined by CO adsorption of 95 $m^2$/g-Pt, and a Pt crystallite diameter of 1.6 nm.

Comparative Example 7

With the exception of replacing the furnace black A used in Example 2 with the aforementioned furnace black B of Comparative Example 1, preparation was performed in the same manner as Example 2, and yielded an electrocatalyst powder containing 30% Pt. The powder produced a Pt analysis result of 30.3 mass %, and displayed a BET specific surface area of 127 $m^2/g$, a Pt surface area as determined by CO adsorption of 85 $m^2$/g-Pt, and a Pt crystallite diameter of 3.2 nm.

Comparative Example 8

With the exception of replacing the furnace black A used in Example 2 with the aforementioned furnace black C of Comparative Example 3, preparation was performed in the same manner as Example 2, and yielded an electrocatalyst powder containing 30% Pt. The powder produced a Pt analysis result of 30.9 mass %, and displayed a BET specific surface area of 241 $m^2/g$, a Pt surface area as determined by CO adsorption of 85 $m^2$/g-Pt, and a Pt crystallite diameter of 3.8 nm.

Comparative Example 9

With the exception of replacing the furnace black A used in Example 3 with the commercially available Ketjenblack EC of Comparative Example 3, preparation was performed in the same manner as Example 3, and yielded an electrocatalyst powder containing 50% Pt. The powder produced a Pt analysis result of 49.6 mass %, and displayed a BET specific surface area of 320 $m^2/g$, a Pt surface area as determined by CO adsorption of 102 $m^2$/g-Pt, and a Pt crystallite diameter of 2.3 nm.

Comparative Example 10

21.7 g of the 30% Pt electrocatalyst prepared in Comparative Example 6 was weighed, and then suspended in water to form a slurry. An aqueous solution of ruthenium (III) trioxide containing 3.3 g of Ru was then added, and following neutralization with a 3 fold equivalence of a sodium hydroxide solution relative to the quantity of ruthenium, the reaction mixture was filtered and dried, and then reduced by hydrogen at 500° C. The product powder revealed a Pt analysis result of 26.0 mass % and a Ru analysis result of 13.1 mass %, and displayed a BET specific surface area of 148 $m^2/g$, and a Pt crystallite diameter of 4.8 nm.

[Preparation of Electrolyte-Electrode Assemblies]

50×50 mm samples of a porous carbon paper of thickness 60 µm (TGP-H-060 manufactured by Toray Industries Ltd.) which had undergone water repellency treatment with PTFE (polytetrafluoroethylene, Teflon 30J manufactured by Mitsui Fluorochemical Co., Ltd.) were prepared as electrode substrates. Each of the platinum supporting or Pt—Ru supporting carbon powder catalysts obtained in Examples 2 to 4 and Comparative Examples 5 to 10 was then mixed with a Teflon powder (KTL-4N manufactured by Kitamura Ltd.) to produce a catalyst/Teflon powder mass ratio of 7/3, alcohol was added, and the mixture was stirred to form a paste. Each of these pastes was applied uniformly across one entire surface of one of the porous carbon paper substrates described above, and then baked to form a catalyst layer. Subsequently, sufficient 5 wt % Nafion solution (manufactured by Sigma-Aldrich Co., Ltd.) to generate 0.02 ml/$cm^2$ relative to the electrode geometric surface area was applied uniformly to the surface of the catalyst layer, and this layer was then dried for one hour at 80° C. Using this method, electrodes were prepared using the platinum supporting carbon powders and the platinum-ruthenium supporting carbon powders of each of Examples and each of Comparative Examples.

An anode electrode formed using a commercial product containing Pt 27% and Ru 13% on Carbon (brand name: SA27-13RC, manufactured by N.E. Chemcat Corporation), and a cathode electrode produced using the platinum supporting carbon powder of Example 2 were positioned on either side of a perfluorosulfonic acid electrolyte membrane (brand name: Nafion 112 manufactured by Dupont Corporation) so that the electrode catalyst layer contacted the electrolyte in each case, and then subjected to thermocompression bonding by hot pressing, to yield an electrolyte membrane electrode assembly MEA-1.

Next, with the exception of using cathode electrodes produced using the platinum supporting carbon powders of Comparative Examples 5 to 8, electrolyte membrane electrode assemblies MEA-2, MEA-3, MEA-4 and MEA-5 were prepared using the same method as described above for the preparation of the MEA-1.

Next, with the exception of using an anode electrode produced using the platinum supporting carbon powder of Comparative Example 9 and a cathode electrode produced using the platinum supporting carbon powder of Example 3, an electrolyte membrane electrode assembly MEA-6 was prepared using the same method as described above for the preparation of the MEA-1.

Next, with the exception of using electrodes produced using the platinum supporting carbon powder of Comparative Example 9 on both surfaces of the electrolyte membrane, an electrolyte membrane electrode assembly MEA-7 was prepared using the same method as described above for the preparation of the MEA-1.

Next, with the exception of using an anode electrode produced using the platinum supporting carbon powder of Comparative Example 9 and a cathode electrode produced using the platinum-ruthenium supporting carbon powder of Example 4, an electrolyte membrane electrode assembly MEA-8 was prepared using the same method as described above for the preparation of the MEA-1.

Next, with the exception of using an anode electrode produced using the platinum supporting carbon powder of Comparative Example 9 and a cathode electrode produced using the platinum-ruthenium supporting carbon powder of Comparative Example 10, an electrolyte membrane electrode assembly MEA-9 was prepared using the same method as described above for the preparation of the MEA-1.

<Performance Evaluation>

Each of the MEAs prepared in the manner described above was integrated into a fuel cell single cell evaluation device (model 1890 manufactured by Scriber Associates Inc.), the cell temperature was set to 80° C., and the single cell was then operated by introducing either hydrogen or hydrogen containing 100 ppm CO which had been subjected to humidification with saturated water vapor at 90° C. at the anode, and introducing either air or oxygen which had been subjected to humidification in a similar manner at 50° C. at the cathode, and the flow rates were increased so as to maintain the gas utilization of each gas at 50%.

Figure 3:
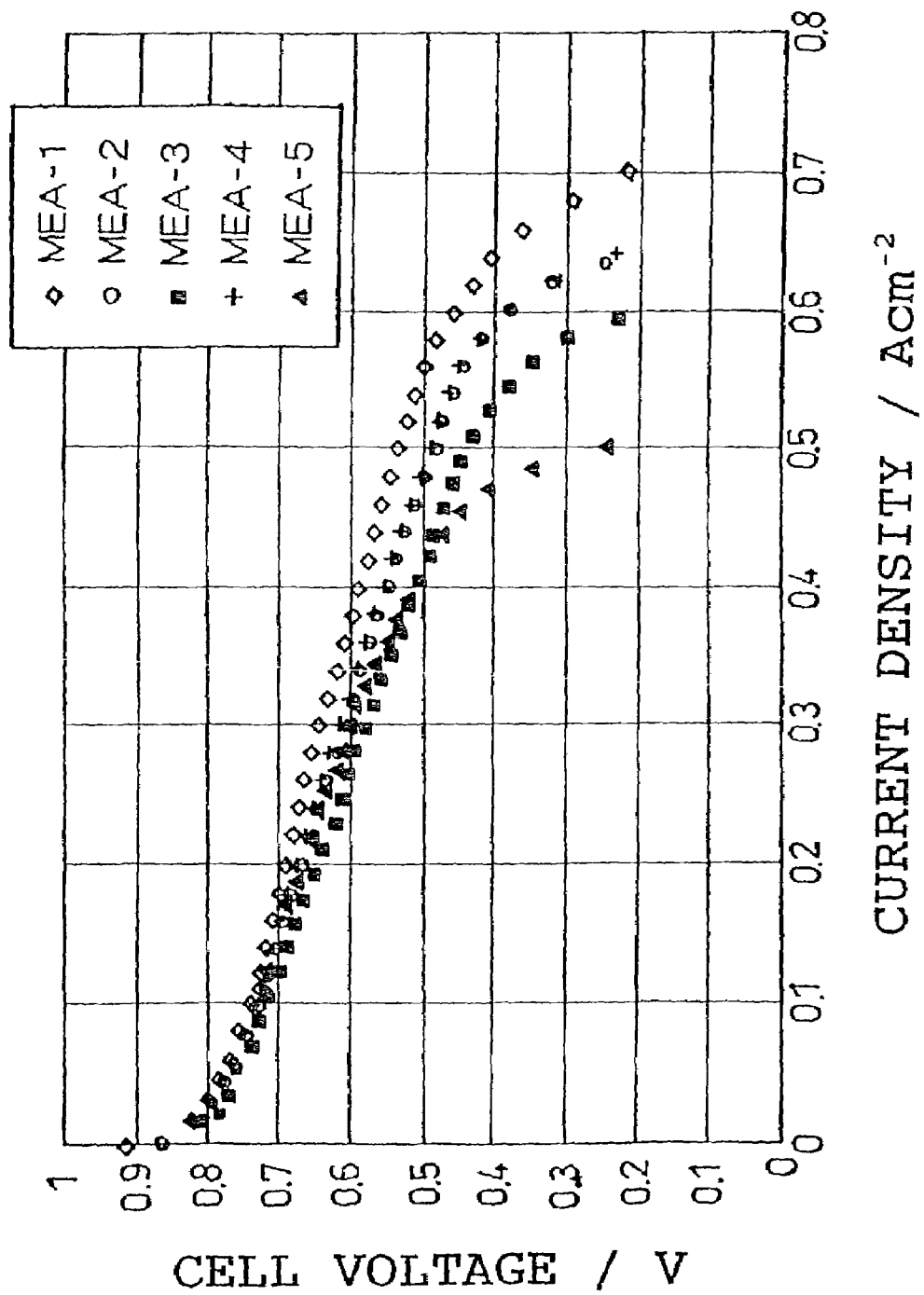
FIG. 3 is a graph showing an evaluation of electrolyte-electrode assemblies prepared using electrocatalyst powders according to Example 2 and Comparative Examples 3 to 6.
Figure 4:
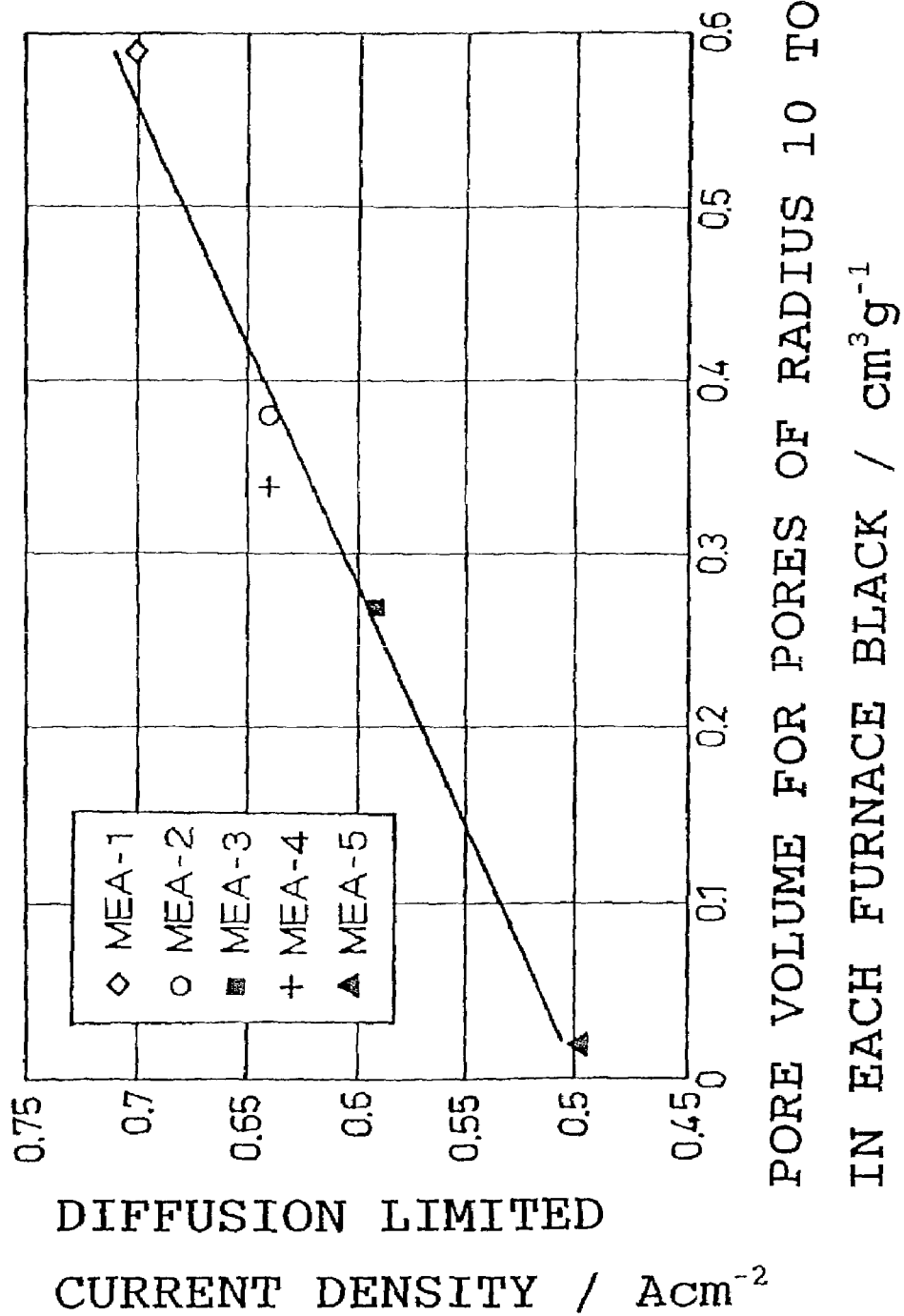
FIG. 4 is a graph showing the relationship between the pore volume at a pore radius of 10 to 30 nm for the carbon blacks used in Example 2 and Comparative Examples 3 to 6, and the diffusion limited current density of the electrolyte-electrode assemblies prepared using electrocatalyst powders according to Example 2 and Comparative Examples 3 to 6.

FIG. 3 shows an evaluation of cathode performance, and represents current density vs. voltage curves using MEA-1 to MEA-5 in which the quantity of platinum used per electrode geometric surface area at the anode was 0.45 mg/$cm^2$, and the quantity of platinum used per electrode geometric surface area at the cathode was 0.3 mg/cm$^2$, for the case in which air was used as the cathode gas. The rapid fall in voltage at the high current density side of the curves is due to the physical diffusion of the air supplied at the cathode through to the electrode surface becoming rate determining, and those cells which display the highest limiting current density at this point are those structures with the best gas diffusion properties. Comparison of these limiting current density values reveals that the MEA-1 with a cathode formed using the electrocatalyst of Example 2 (carrier: furnace black A) displays the highest value, followed by the MEA-2 with a cathode formed using the electrocatalyst of Comparative Example 5 (carrier: Ketjenblack EC) and the MEA-4 with a cathode formed using the electrocatalyst of Comparative Example 7 (carrier: furnace black B) which displayed almost equal values, and then followed in sequence by the MEA-3 with a cathode formed using the electrocatalyst of Comparative Example 6 (carrier: Vulcan XC72R ) and the MEA-5 with a cathode formed using the electrocatalyst of Comparative Example 8 (carrier: furnace black C). A graph showing these diffusion limited current density values for each of the MEAs along the vertical axis, plotted against the volume of the pores with a pore radius of 10 to 30 nm from FIG. 2 along the horizontal axis is shown in FIG. 4. From this graph it is evident that MEA-1 with a cathode formed using the electrocatalyst of Example 2 (carrier: furnace black A) and with a specified pore volume of greater than 0.40 cm$^3$/g displays the most superior performance.

Figure 5:
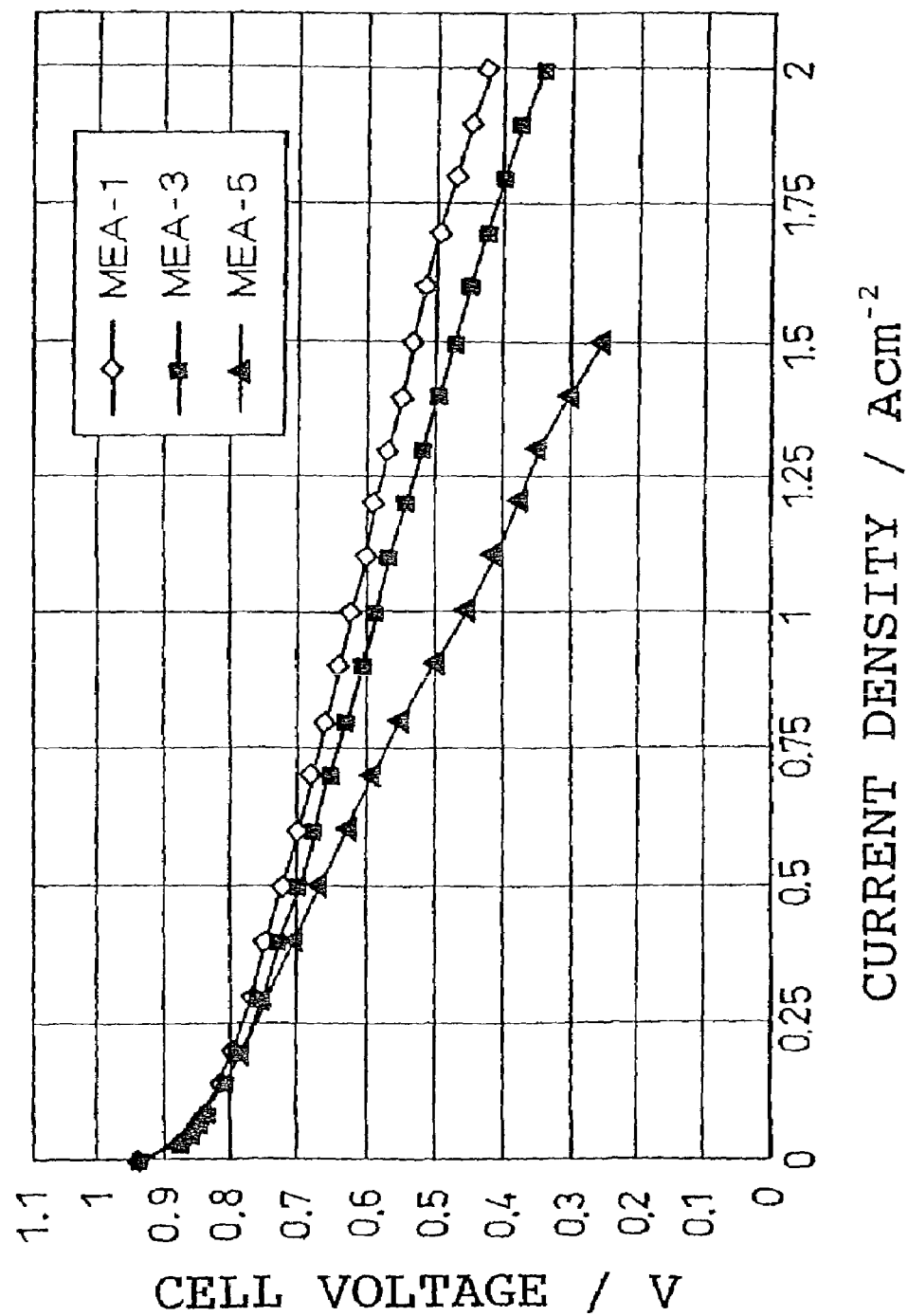
FIG. 5 is a graph showing an evaluation of electrolyte-electrode assemblies prepared with varying quantities of platinum in the anode and the cathode, using electrocatalyst powders according to Example 2 and Comparative Examples 4 and 6, which contain varying quantities of platinum in the anode and the cathode.

FIG. 5 shows an evaluation of cathode performance, and represents current density vs. voltage curves using the MEA-1, the MEA-3 and the MEA-5 in which the quantity of platinum used per electrode geometric surface area at the anode was 0.45 mg/cm$^2$, and the quantity of platinum used per electrode geometric surface area at the cathode was 0.4 mg/cm$^2$, for the case in which oxygen was used as the cathode gas. The results reveal that the cell voltage for the MEA-1 with a cathode formed using the electrocatalyst of Example 2 (carrier: furnace black A) was highest at all current density values, followed in sequence by the MEA-3 with a cathode formed using the electrocatalyst of Comparative Example 6 (carrier: Vulcan XC72R) and then the MEA-5 with a cathode formed using the electrocatalyst of Comparative Example 8 (carrier: furnace black C). Furthermore, at high current density values, where the effect of physical diffusion becomes particularly marked, the differences between the cell voltages increased.

Figure 6:
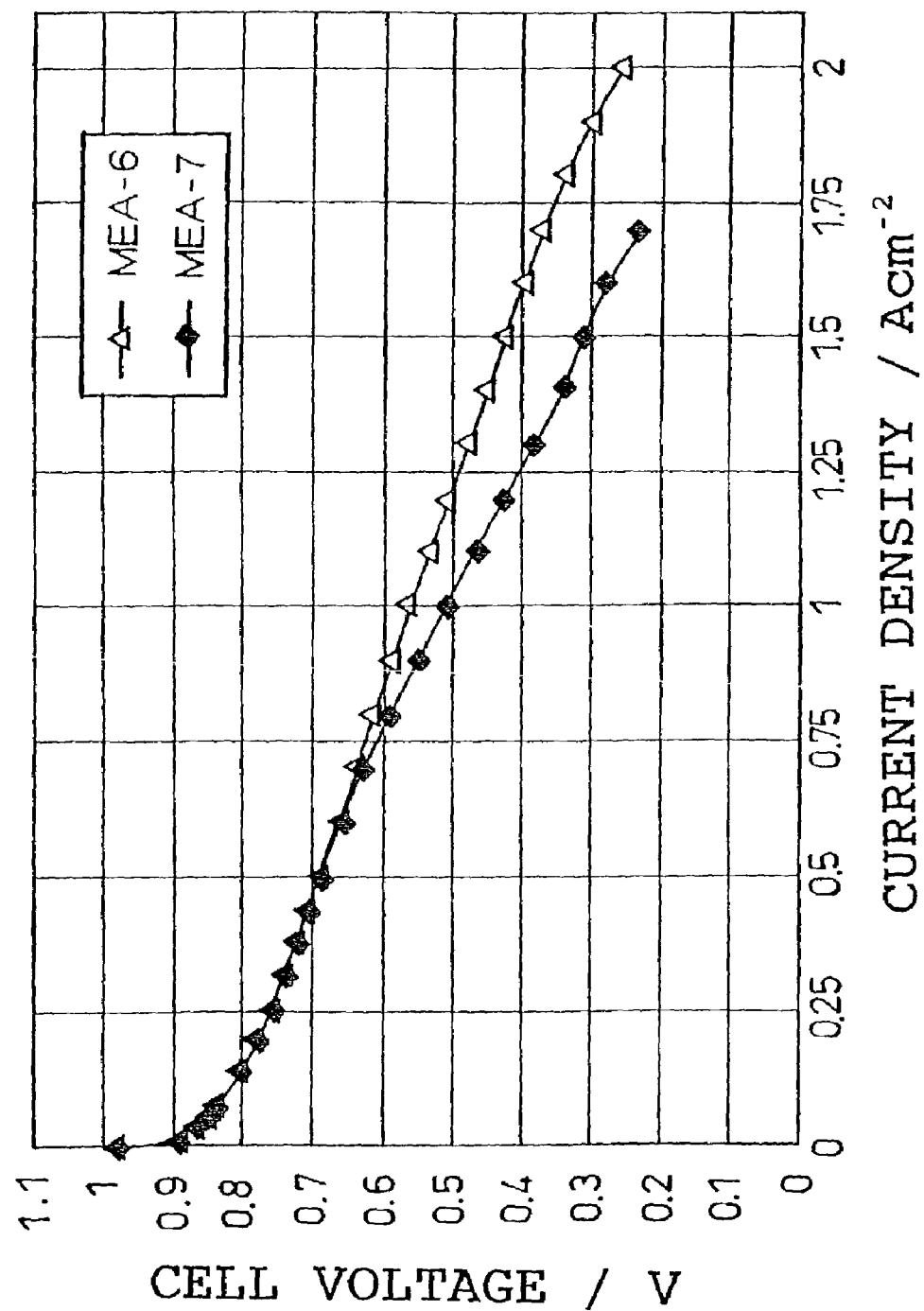
FIG. 6 is a graph showing an evaluation of electrolyte-electrode assemblies prepared using electrocatalyst powders according to Example 3 and Comparative Example 9.

FIG. 6 shows an evaluation of cathode performance, and represents current density vs. voltage curves using the MEA-6 and the MEA-7 in which the quantity of platinum used per electrode geometric surface area at the anode was 0.7 mg/cm$^2$, and the quantity of platinum used per electrode geometric surface area at the cathode was 0.7 mg/cm$^2$, for the case in which oxygen was used as the cathode gas. The results reveal that the cell voltage for the MEA-6 with a cathode formed using the electrocatalyst of Example 3 (carrier: furnace black A) was higher than that of the MEA-7 with a cathode formed using the electrocatalyst of Comparative Example 9 (carrier: Ketjenblack EC) at all current density values. Furthermore, at high current density values, where the effect of physical diffusion becomes particularly marked, the difference between the two cell voltages increased.

Figure 7:
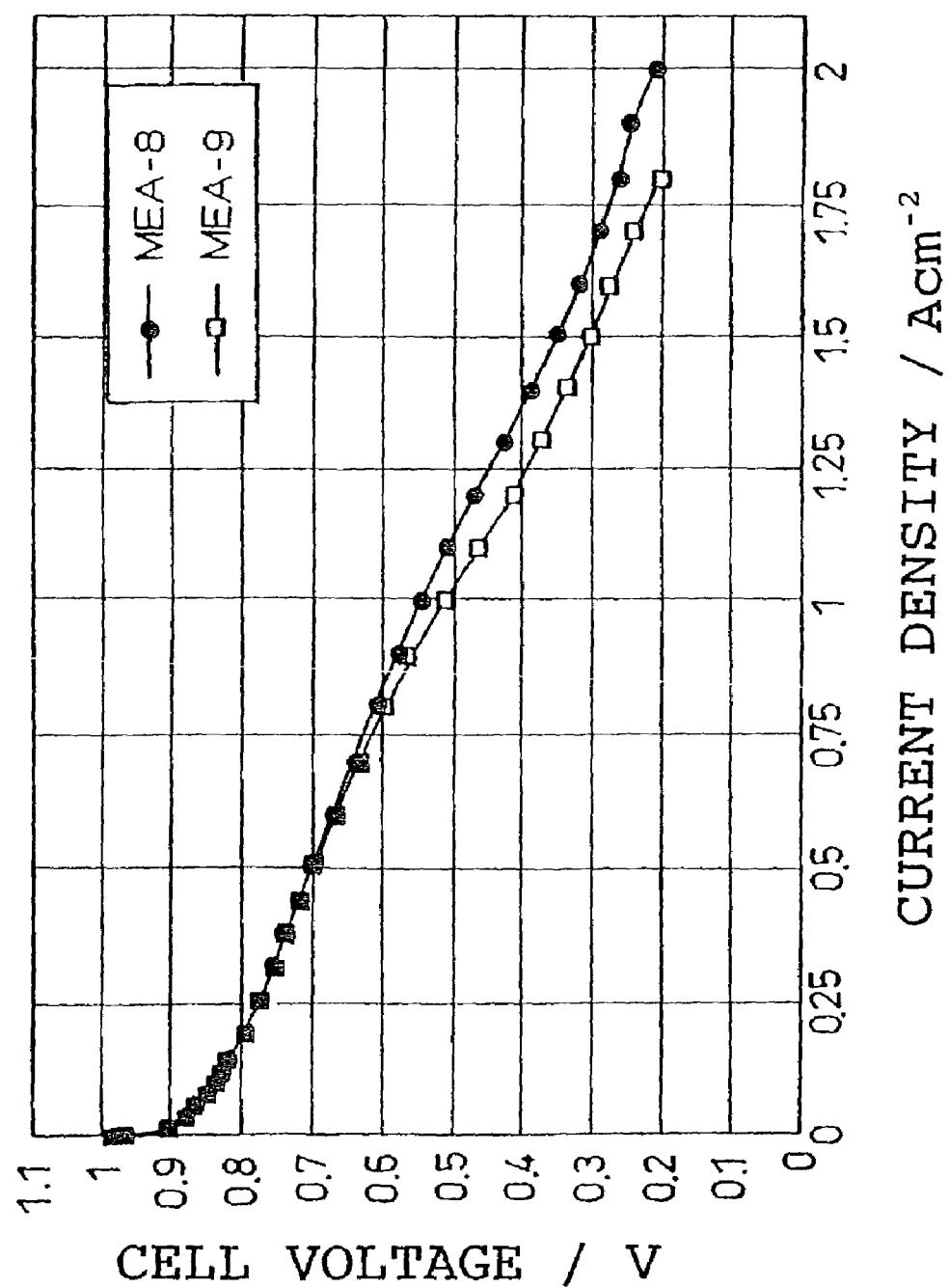
FIG. 7 is a graph showing an evaluation of electrolyte-electrode assemblies prepared using electrocatalyst powders according to Example 4 and Comparative Examples 8.

FIG. 7 shows an evaluation of cathode performance, and represents current density vs. voltage curves using the MEA-8 and the MEA-9 in which the quantity of platinum used per electrode geometric surface area at the anode was 0.7 mg/cm$^2$, and the quantity of platinum used per electrode geometric surface area at the cathode was 0.45 mg/cm$^2$, for the case in which oxygen was used as the cathode gas. The results reveal that the cell voltage for the MEA-8 with a cathode formed using the electrocatalyst of Example 4 (carrier: furnace black A) was higher than that of the MEA-9 with a cathode formed using the electrocatalyst of Comparative Example 10 (carrier: Vulcan XC72R) at almost all current density values. Furthermore, at high current density values, where the effect of physical diffusion becomes particularly marked, the difference between the two cell voltages increased, confirming the superiority of the furnace black A even for alloy type catalysts.

Figure 8:
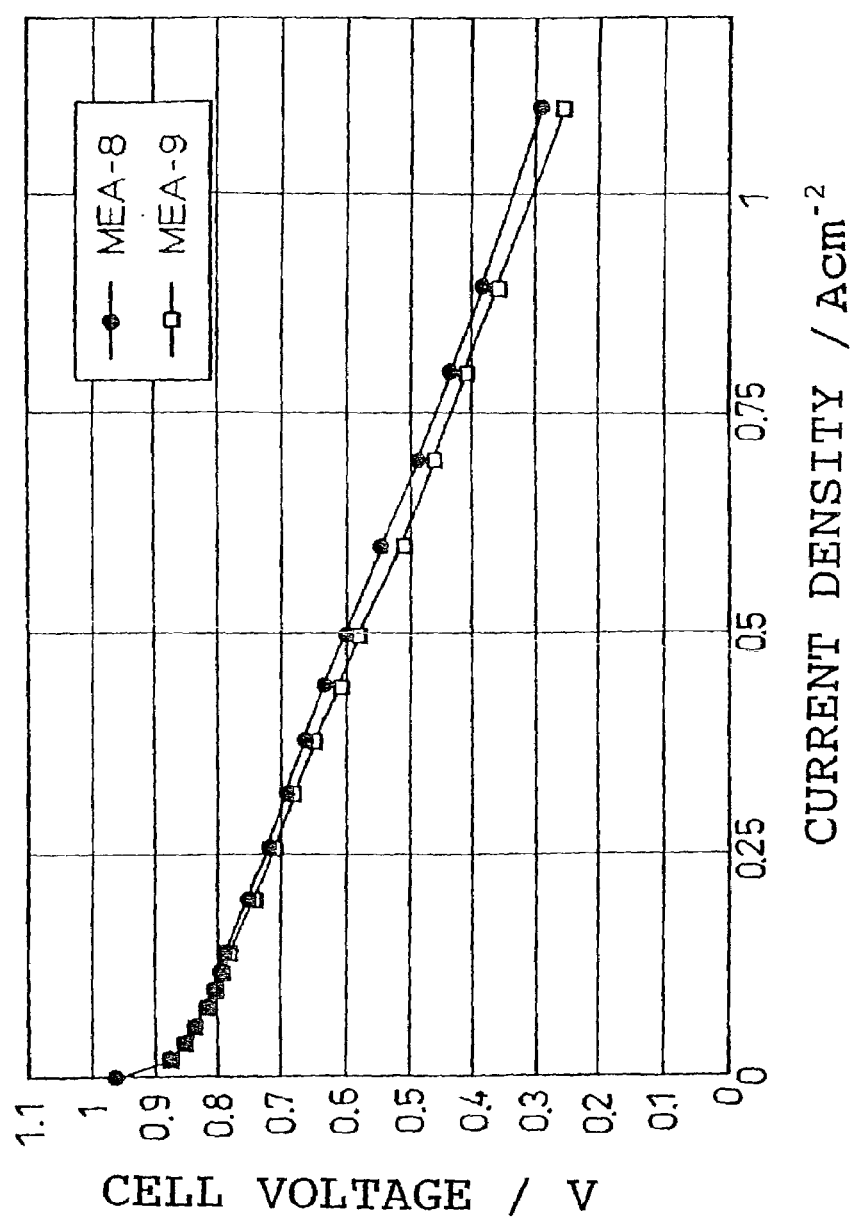
FIG. 8 is a graph showing an evaluation of electrolyte-electrode assemblies prepared using electrocatalyst powders according to Example 4 and Comparative Example 10, in the case where the anode gas is hydrogen gas containing 100 ppm of CO.

FIG. 8 shows an evaluation of anode performance, and represents current density vs. voltage curves for the cases in which the anode and the cathode were reversed in the aforementioned MEA-8 and the MEA-9, hydrogen containing 100 ppm of CO was used as the anode gas, and oxygen was used as the cathode gas. The results reveal that the cell voltage for the MEA-8 with an anode formed using the electrocatalyst of Example 4 (carrier: furnace black A) was higher than that of the MEA-9 with an anode formed using the electrocatalyst of Comparative Example 10 (carrier: Vulcan XC72R) at almost all current density values, confirming the superiority of the furnace black A even in terms of CO resistant performance.

By using a furnace black with specified properties according to the present invention as a carrier for a solid polymer electrolyte fuel cell electrocatalyst, a pore structure can be formed which ensures adequate voids for enabling diffusion of the gas supplied for the electrode reaction (hydrogen or oxygen or the like) through to the catalyst, resulting in superior cell characteristics including an improvement in the activity of platinum based catalysts, and only minor deterioration in platinum based catalytic activity even if carbon monoxide, which functions as a catalyst poison, is mixed with the hydrogen gas fuel.

What is claimed is:

1. An electrocatalyst, comprising:
    a carrier comprising a furnace black with
        a DBP oil absorption ranging from 180 to 250 cm$^3$/100 g,
        a specific surface area as measured by a BET method- ranging from 250 to 350 m$^2$/g,
        a primary particle diameter value of 10 to 17 nm, and
        a total volume of pores with a pore radius of 10 to 30 nm of at least 0.40 cm$^3$/g, and
    platinum supported on said carrier,
    wherein a quantity of platinum relative to said entire electrocatalyst is within a range from 30 to 70 mass %, and
    wherein the furnace black is produced by an oil furnace method.

2. The electrocatalyst according to claim 1, further comprising, in additional to platinum, at least one metal selected from the group consisting of palladium, rhodium, iridium, ruthenium, gold, silver, iron, zinc, nickel, molybdenum, cobalt, tin, chromium, manganese, rhenium, tungsten and copper, supported on said carrier.

3. An electrochemical device comprising an electrocatalyst as defined in claim 1.

4. The electroehemical device according to claim 3 which is any one of a solid polymer electrolyte fuel cell, an electrolysis device and a sensor.

5. The electrocatalyst of claim 1, wherein a quantity of platinum relative to said entire electrocatalyst is within a range from 50 to 70 mass %.

\* \* \* \* \*